(12) United States Patent
Sowell et al.

(10) Patent No.: US 6,779,476 B1
(45) Date of Patent: Aug. 24, 2004

(54) LOW SOLAR ABSORBING NONSKID COMPOSITION AND APPLIED CONFIGURATION FOR A FLIGHT DECK

(75) Inventors: Dale A. Sowell, Alexandria, VA (US); Peter J. Sarman, Ashburn, VA (US); Eugene C. Fischer, Stevensville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/443,751

(22) Filed: May 23, 2003

(51) Int. Cl.$^7$ ............................................. B63B 35/50
(52) U.S. Cl. ........................................ 114/261; 114/85
(58) Field of Search ................................ 114/261, 262, 114/85

(56) References Cited

U.S. PATENT DOCUMENTS

| | | | | |
|---|---|---|---|---|
| 3,652,485 A | * | 3/1972 | Cizek, Jr. et al. | ............ 523/150 |
| 6,186,078 B1 | * | 2/2001 | Brown | ..................... 108/57.25 |
| 6,632,860 B1 | * | 10/2003 | Hansen et al. | ............... 523/435 |

FOREIGN PATENT DOCUMENTS

EP          1 000 957 A1  *  5/2000

OTHER PUBLICATIONS

Strait et al. U.S. patent 6,518,911 B2 issued Feb. 11, 2003.
Fischer et al. U.S. patent 6,344,246 B1 issued Feb. 5, 2002.
Stahovic et al. U.S. patent 5,989,328 issued Nov. 23, 1999.
Parks U.S. patent 5,952,057 issued Sep. 14, 1999.
Hermele et al. U.S. patent 5,686,507 issued Nov. 11, 1997.
Cambon U.S. patent 4,859,522 issued Aug. 22, 1989.
Kraft et al. U.S. patent 4,760,103 issued Jul. 26, 1988.
Supcoe et al. U.S. patent 5,749,959 issued May 12, 1998.
Supcoe U.S. patent 4,311,623 issued Jan. 19, 1982.
Supcoe et al. U.S. patent 4,289,677 issued Sep. 15, 1981.
Yializis et al. U.S. patent 5,912,069 issued Jun. 15, 1999.
Schreiber et al. U.S. patent application Publication US 2002/0071962 A1 published Jun. 13, 2002.
Atita U.S. patent 5,472,795 issued Dec. 5, 1995.
Nevoret et al. U.S. patent 6,451,076 B1 issued Sep. 17, 2002.
Swei et al. U.S. patent 6,395,044 B1 issued May 28, 2002.
Wei et al. 6,293,980 B2 issued Sep. 25, 2001.
Caracostas et al. U.S. patent 6,096,107 issued Aug. 1, 2000.
Wei et al. U.S. patent 5,863,306 issued Jan. 26, 1999.
Wei et al. U.S. patent 5,833,724 issued Nov. 10, 1998.

(List continued on next page.)

*Primary Examiner*—Sherman Basinger
(74) *Attorney, Agent, or Firm*—Howard Kaiser

(57) ABSTRACT

A configuration of grooves provided in a nonskid coating on an aircraft carrier flight deck promotes the lateral and backward drainage of slippery liquids. A straight longitudinal middle groove extending fore and aft intersects multiple "W"-shaped grooves each extending athwartship. Each W-shaped groove includes a pair of "V"-shaped groove sections located on opposite sides of the middle groove. Each V-shaped groove section aims vertex-forward and includes a pair of straight groove segments defining an interior angle in the approximate range between 60° and 120°. Abrasive entities may be included in the coating for nonskid purposes. The coating's inclusion of metal-polymer nanolaminate entities along with other pigment entities may serve to reduce or minimize solar heat absorption, particularly in terms of increasing solar reflectance and decreasing thermal emittance. The provision of pyramidal texturing in the coating may provide additional nonskid and/or solar heat absorptive benefits.

20 Claims, 3 Drawing Sheets

OTHER PUBLICATIONS

Performance Specification entitled "Coating System, Non-Skid, For Roll or Spray Application (Metric)," United States Military, MIL–PRF–24667A (Navy), Aug. 14, 1992, superseding MIL–C–24667 (Navy), Sep. 11, 1986 (51 pages); available . online at http://coatings.nfesc.navy.mil/FAQs/1110.htm.

"Ultra–High Surface Area Aluminum–Polymer Nanolaminate Composites," *Air Force SBIR Impact*, Air Force Research Laboratory (AFRL) (2 pages); available online at http://www.afrl.af.mil/sbir/impact/is–5.pdf.

"Non–Skid Coatings," Fire Protection and Sea Survival Branch, Code 643, Naval Surface Warfare Center, Carderock Division (3 pages); available online at http://www.dt.navy.mil/code60/code643/nonskid/nonskid.htm.

"Proper Methods of Surface Preparation and Installation of American Safety Technologies Non–Skid Coatings," ITW American Safety Technologies; available online at http://www.astantislip.com/marinefolder/ast_marine/all_images/SurfacePrep.pdf..

"Military and Marine," ITW American Safety Technologies; available online at http://www.itwast.com/military.htm (1 page).

Technical Data Sheets (2 pages each; 24 total pages), available online at http://www.itwast.com/military.htm, for the following twelve ITW American Safety Technologies products: MS–375G Non–Slip Deck Coating; MS–375L Non–Slip Deck Coating; MS–400G High Solids Non–Slip Deck Coating; MS–400G LT High Solids Fast Curing Non–Slip Deck Coating; MS–400L High Solids Non–Slip Deck Coating; MS–400L LT High Solids Fast Curing Non–Slip Deck Coating; MS–440G High Solids Non–Slip Deck Coating; MS–660G UV/LSA UV Resistant Epoxy Patent Pending Low Solar Absorbing Hi–Solids Non–Slip Deck Coating NAVSEA Approved System; MS–880G Flexible Epoxy Non–Slip Deck Coating; MS–1600 Flexible Epoxy Intermediate Membrane; MS–2000 Non–Slip Deck Coating; LSA Trax Coat Low Solar Absorbing Waterbased Acrylic Anti–Slip Enhancer.

"Technical Information Site," ITW American Safety Technologies:

* cited by examiner

| TWO TYPICAL FORMULATIONS OF THE PRESENT INVENTION'S LOW SOLAR ABSORBING NONSKID COATING MATERIAL | | |
|---|---|---|
| MATERIALS | PERCENT WEIGHT | |
| | NONABRASIVE NONSKID | ABRASIVE NONSKID |
| Component A | | |
| Epoxy resin | 18 | 15 |
| Magnesium Silicate | 7.45 | 4.45 |
| Phthalocyanine Blue pigment | .05 | .05 |
| Aluminum granules | 45 | |
| Aluminum Oxide abrasive | | 45 |
| Boron Carbide abrasive | | 5 |
| defoamer(s) and additive(s) | 1.5 | 1.5 |
| Garnet abrasive | | 5 |
| Titanium Dioxide pigment | 10 | 10 |
| Parachlorobenzofluride solvent | 5 | 5 |
| Yellow Iron Oxide pigment | 0.5 | 0.5 |
| Red iron Oxide pigment | 0.5 | 0.5 |
| Drier(s) | 0.5 | 0.5 |
| Component B | | |
| Nanolaminate particulate | 1.5 | 1.5 |
| Epoxy curative resin | 10 | 6.0 |
| Total | 100 | 100 |

FIG. 1

LOW SOLAR ABSORBING NONSKID COMPOSITION AND APPLIED CONFIGURATION FOR A FLIGHT DECK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to materials suitable for coating surfaces, more particularly to methods, compositions and structures pertaining to high traction or temperature-reducing materials and the utilization thereof for coating surfaces such as flight decks.

The United States Navy is developing, for aircraft carrier flight decks and other ship decks, materials having both "nonskid" (also spelled "non-skid") and "low solar absorbing" ("LSA") attributes. It is desirable that materials used for coating flight decks be characterized both by nonslippage and by reduced flight deck temperatures. A high degree of flight deck traction is required for pedestrian and vehicular transportation and especially for takeoff and landing of aircraft. Moreover, the flight deck of an aircraft carrier represents an enormous solar absorber. Reducing flight deck temperatures would reduce the heat loads on the living and working spaces beneath the flight deck, ultimately reducing the air conditioning requirements and associated energy demands and increasing the habitability of these spaces. Rather than upgrade a ship's air conditioning system, it would be preferable to effect a flight deck coating so as to reduce temperatures in the habitation spaces and working electronics spaces.

All bodies at non-zero temperature emit radiation (heat flux) as given by the Stephan-Boltzmann Law, as follows: $P = \epsilon \sigma T^4$, where P is the radiated power (heat flux), $\epsilon$ is the material's spectral emissivity, $\sigma$ is the Stephan-Boltzmann constant ($5.679 \times 10^{-8}$ W/(m$^2$K)), and T is the body's absolute temperature (° K). There are two ways to reduce the amount of radiated power, P, viz., by either reducing the body's temperature, or reducing the body's spectral emissivity. Since it is unfeasible to sufficiently cool the entire flight deck, controlling the flight deck's emissivity in the thermal emission bands is the only viable approach for thermal control. Existing LSA non-skid products have low-emissivity and perform well in the solar (0.9–2.5 μm) spectral band; however, these existing materials provide an incomplete solution because they fail to address the material's emissivity in the thermal emission (3–5 μm and 8–12 μm) spectral bands.

The U.S. Navy has other concerns regarding nonskid flight decks, such as durability of the nonskid formulation. Performance failures and replacement costs for nonskid decking materials are a major problem aboard ships, especially aboard aircraft carriers in high wear, high traffic areas requiring constant maintenance, e.g., landing/approach areas and approaches to elevators. Typically, these aircraft carrier flight deck areas constitute about 60,000 square feet of surface. Navy performance specifications require 10,000 landings; see the U.S. Military's Performance Specification, incorporated herein by reference, entitled "Coating System, Non-Skid, For Roll or Spray Application (Metric)," MIL-PRF-24667A (Navy), Aug. 14, 1992, superseding MIL-C-24667 (Navy), Sep. 11, 1986. However, in-service experience has seen emergent failure in as little as 3,000 landings. Totally unsatisfactory operational conditions were prevalent during the United States' 1990–1991 Desert Shield/Desert Storm campaigns in association with excessive wear, down to the bare metal, of the flight deck; specifically, the bare metal decking in the cable arrest areas forced loss of launch certification and put the handling aircraft crew at risk. Preliminary indications are that some flight decks performed better during the United States' 2003 war against Iraq. The operational capabilities of aircraft carriers are further degraded because of concomitant weight restrictions.

A nonskid decking material is required to be configured in such a fashion as to allow complete drainage from the flight deck (e.g., of an aircraft carrier) of water (e.g., rainwater or seawater), spilled fuel, detergents and other liquids that will detract from the nonskid qualities of the decking. Existing designs of nonskid decking have practically continuous troughs (grooves) running the entire length of the aircraft carrier deck. These conventional configurations involving longitudinal grooves succeed insofar as "wind-over-the-deck" driving forces bring about drainage of contaminating liquids aftward of such deck. However, such conventional designs, while worthwhile from a drainage standpoint, are less than optimal in other respects. Of special note are considerations regarding the frictional drag of aircraft tires, such as will occur during braking or during rolling over the deck while maneuvering or prior to capture. The forward motion of aircraft, parallel to the grooves, will tend to create a "bow wave" of liquid that moves along with the aircraft tire, thus undesirably reducing the frictional capacity of the nonskid surface.

Incorporated herein by reference are the following United States patents pertaining to coating formulations or methods related thereto, and involving nonskid or electromagnetic absorptive properties: Strait et al. U.S. Pat. No. 6,518,911 B2 issued Feb. 11, 2003; Fischer et al. U.S. Pat. No. 6,344,246 B1 issued Feb. 5, 2002; Stahovic et al. U.S. Pat. No. 5,989,328 issued Nov. 23, 1999; Parks U.S. Pat. No. 5,952,057 issued Sep. 14, 1999; Hermele et al. U.S. Pat. No. 5,686,507 issued Nov. 11, 1997; Cambon U.S. Pat. No. 4,859,522 issued Aug. 22, 1989; Kraft et al. U.S. Pat. No. 4,760,103 issued Jul. 26, 1988; Supcoe et al. U.S. Pat. No. 5,749,959 issued May 12, 1998; Supcoe U.S. Pat. No. 4,311,623 issued Jan. 19, 1982; Supcoe et al. U.S. Pat. No. 4,289,677 issued Sep. 15, 1981.

SUMMARY OF THE INVENTION

In view of the foregoing, it is an object of the present invention to provide an improved nonskid and low solar absorbing composition for covering flight decks and other surfaces.

Another object of the present invention is to provide such a composition which reduces emissivity in the thermal emission spectral bands.

Further objects of the present invention are to provide a method and a structure for covering flight decks and other surfaces with a nonskid composition, wherein the applied covering is so configured as to avoid or minimize a reduction in frictional quality of the surface.

According to typical inventive embodiments, a structure for situation upon a substrate comprises a coating composition in a cured condition. The inventive structure has formed therein an approximately linear medial groove and plural "herringbone" ("W"-shaped) grooves. Each herringbone groove traverses the medial groove so as to be divided thereby into two "V"-shaped groove sections. Each V-shaped groove section is formed by two approximately linear groove segments. Each groove segment is obliquely oriented with respect to the medial groove. It is frequent inventive practice that each groove segment describe, relative to the medial groove, an obtuse geometric angle in the range between approximately 120° and approximately 150°. According to some inventive embodiments, at least a portion of the inventive structure is approximately characterized by a pyramidal texture.

It may be particularly propitious to practice the present invention in the nautical/naval realm in association with marine decks such as aircraft carrier flight decks. According to such inventive embodiments, the substrate is a marine deck which is approximately characterized by a forward deck end, an aft deck end, a port deck side, a starboard deck side and a deck length (between the forward deck end and the aft deck end). The medial groove extends at least substantially the entire length. Each V-shaped groove section points approximately toward the forward deck end. Each herringbone groove extends at least substantially the entire distance between the port deck side and the starboard deck side. In many of these and other kinds of inventive applications, the coating composition will conditionally have nonskid and low solar absorbing properties.

Although a variety of coating formulations can be inventively practiced, the inventive coating formulations may prove to be especially advantageous for marine deck applications. Generally, an inventive coating composition in a cured condition will have high solar reflectance, low thermal emittance and nonskid attributes, and will comprise in an uncured condition by percentage weight: nanolaminate pigment elements (e.g., elements having, on a very small scale, an alternating laminar arrangement of metal and polymeric materials) in the range between greater than zero percent and approximately ten percent; epoxy resin in the range between approximately fifteen percent and approximately thirty-five percent; non-nanolaminate pigment elements in the range between approximately five percent and approximately twenty percent; and abrasive elements in the range between greater than zero percent and approximately seventy percent.

The present invention provides a unique low solar absorbing (LSA) nonskid formulation suitable for coating a variety of surfaces, including aircraft carrier flight decks and other ship decks. In particular, the present invention provides a "high solar reflectance, low thermal emittance" ("HSR/LTE") non-skid "paint" formulation comprising advanced nanoscale pigmentation materials. According to many embodiments of this invention, the inventive formulation is applied in a preferential pattern to improve traction, water resistance, durability, liquid drainage and overall ship survivability. The present invention's preferential pattern need not be practiced in association with the present invention's nonskid formulation, but can be practiced in association with virtually any nonskid formulation.

The inventive nonskid LSA formulation includes HSR/LTE pigmentation, which acts to reduce solar absorption and heat re-radiation. According to many inventive embodiments, the HSR/LTE pigmentation includes titanium dioxide, iron oxide and phthalocyanine. Moreover, a typical inventive nonskid formulation includes specialized nanoscale pigments such as metalpolymer nanolaminate materials disclosed by Yializis et al. U.S. Pat. No. 5,912,069 issued Jun. 15, 1999, incorporated herein by reference. Furthermore, when the inventive nonskid formulation is applied in a pyramidal structural design on the nonskid decking surface(s), the present invention is especially efficacious in terms of reducing the solar absorption and the re-radiation of heat to the below deck areas.

The present invention's concerted influence of the HSR/LTE pigmentation, the nanoscale pigmentation and the pyramidal structural configuration (of the nonskid decking itself, once cured) is especially effective in reducing the infrared signature of the carrier deck. In addition, the application of the inventive formulation as nonskid decking so as to be characterized by the present invention's "herringbone"-like drainage pattern will result in significant increases in ship survivability along with improved personnel and equipment safety. Furthermore, about 4.5 acres of nonskid material typically is used to coat an aircraft carrier flight deck; application of the present invention's relatively light (less massive) formulation may actually reduce a ship's weight by twenty percent or more.

The present invention's HSR/LTE nonskid formulation retains basic physical properties desirable for reflection of infrared energy, as compared with current U.S. Navy approved nonskid formulations. That is, the present invention equivalently affords high solar reflective qualities such as taught by the aforementioned Supcoe et al. U.S. Pat. No. 5,749,959, Supcoe U.S. Pat. No. 4,311,623 and Supcoe et al. U.S. Pat. No. 4,289,677, who disclose coating formulations that are in certain ways characterized by low solar absorption. In addition, the inventive LSA formulation affords certain other high solar reflection and low thermal emissivity characteristics desired by the U.S. Navy. Existing LSA formulations are only low emissive in spectral bands below 2 $\mu$m; above this region, in the thermal emission bands, they are highly emissive and therefore highly absorptive. In contrast, the present invention affords high reflectivity and low emissivity in the 2–15 $\mu$m range, in particular in the thermal emission (3–5 $\mu$m and 8–12 $\mu$m) spectral bands.

The inventors performed testing of the inventive composition and obtained acceptable readings above the 1-micron level in terms of high reflectivity and low emissivity. It is believed that the present invention's HSR/LTE nonskid formulation products will not only enhance nonskid properties and reduce solar absorbency, but will also offer new war fighting capabilities. Deck temperatures underneath the inventive nonskid coating will be reduced, and hence the heat transfer from the deck surface to the compartment beneath will be reduced. The reduction in temperature will facilitate the cooling of air-conditioned space to a maximum of perhaps about fifteen percent. The applicability of the present invention is not limited to deck surfaces such as flight decks. In naval applications, shipboard activity and ship survivability can be improved by the inventive LSA nonskid decking as a result of increased infrared reflectance and decreased temperatures on various deck surfaces, aircraft runways, various storage compartments, heat shields, and electrical housing structures.

Inventive principles can be applied not only to ship decks such as flight decks aboard aircraft carriers, but also to myriad other surfaces aboard marine vessels and elsewhere in both military and nonmilitary contexts. The present invention is especially efficacious when practiced as a superior HSR/LTE nonskid "system" combining the inventive features of the HSR/LTE nonskid coating formulation (in particular, the nanoscale materials included therein), the applied coating's herringbone groove pattern and the applied coating's pyramidal textural surface pattern. This inventive system represents a complete approach to providing nonskid aboard carrier ships whereby several characteristics are improved upon, particularly as pertains to safety of aircraft and personnel and to remote detection and targeting of ships (especially, in infrared detection threat bands).

This application bears some relation to copending nonprovisional U.S. patent application No. 09/372,602, filed Aug. 12, 1999, entitled "Visual-Tactile Signage," joint inventors Eugene C. Fischer, Dale A. Sowell, John P. Wehrle and Albert G. Holder, incorporated herein by reference, now U.S. Pat. No. 6,696,126.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 1 is a tabular representation of two embodiments, one abrasive and the other nonabrasive, of a nonskid LSA coating composition in accordance with the present invention.

DETAILED DESCRIPTION OF THE INVENTION

Figure 2:
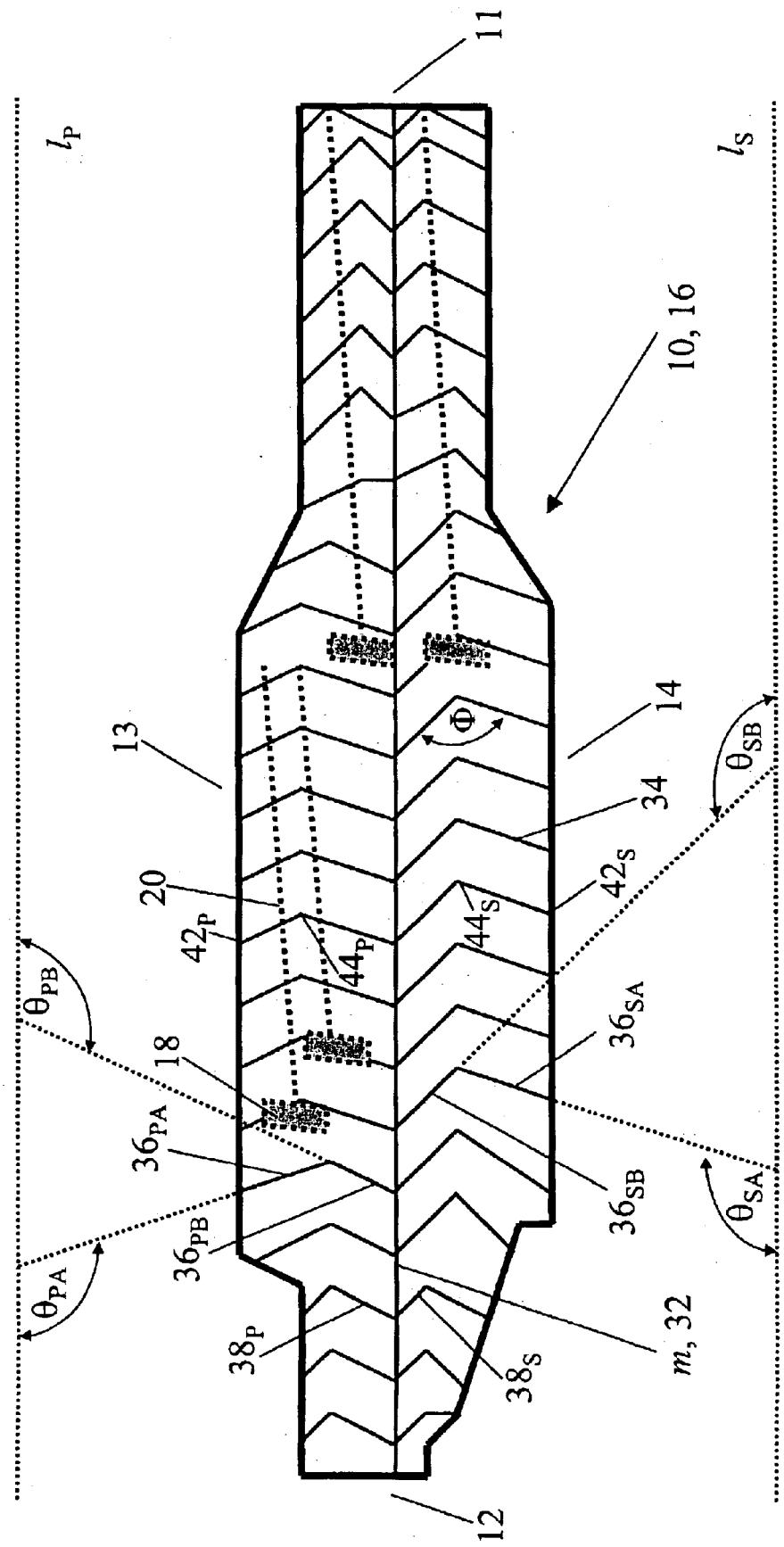
FIG. 2 is a diagrammatic top plan view of an embodiment, in accordance with the present invention, of a nonskid coating product as used in association with the flight deck of a representative aircraft carrier such as the U.S.S. NIMITZ, this view particularly illustrating the "median-plus-herringbone" groove pattern characteristic of typical inventive embodiments.

Referring now to FIG. 1, the present invention's HSR/LTE nonskid decking material in the uncured (liquid) stage is a resinous bulk liquid including an epoxy resin, an epoxy curative agent, titanium dioxide pigment, phthalocyanine blue pigment, magnesium silicate, defoamer(s) and other additive(s), garnet abrasive, parachlorobenzofluride solvent, yellow iron oxide pigment, red iron oxide pigment, drier(s), and infrared-reflective polymer/metal/polymer nanolaminate pigments. If the inventive material is of the abrasive nonskid variety, it also includes aluminum oxide, boron carbide abrasive and garnet. If the inventive material is of the nonabrasive variety, it also includes aluminum granules (as distinguished from the nonabrasive nonskid variety, which includes aluminum oxide).

The main categories of ingredients used for formulating the inventive coating are solvent, resin (binder), pigment and abrasive. Additionally, the inventive formulation can contain known additives such as antifoam agents, flattening agents (to reduce gloss), mildewcides, adhesion promoters, viscosity modifiers and ultraviolet stabilizers. The "vehicle" (liquid portion) includes the solvent (the "volatile vehicle" which evaporates as the coating cures) and the resin (the "nonvolatile vehicle"). After evaporation of the solvent, the "total solids" or "film solids" which remain include the resin, pigment and abrasive.

Many conventional epoxy coatings are of a two-component nature. Similarly, according to typical embodiments, the inventive formulation is a two-component coating. Component A (the base component) contains the epoxy resin, the parachlorobenzofluride solvent, various kinds of pigments (e.g., titanium dioxide, phthalocyanine blue, yellow iron oxide, red iron oxide), and various kinds of abrasive (e.g., aluminum oxide, boron carbide, garnet) and nonabrasive (e.g., aluminum granulation) particulate. Component B contains the epoxy resin curing agent and the nanolaminates. Components A and B are mixed together (until of smooth consistency and uniform color) in order that the appropriate chemical reaction and concomitant curing of the inventive coating take place. Once mixed, the inventive formulation can be applied to the substrate (e.g., ship deck or other surface) by any of various techniques, such as brush, roller, air spray, airless spray and trowel.

Titanium dioxide (typically white), phthalocyanine blue, yellow iron oxide, red iron oxide are known pigments in the paint, plastic and paper industries. Magnesium silicate (or hydrated magnesium silicate, more commonly known as "talc") is known in the paint industry to be useful as a strengthener (e.g., for reinforcing various types of resins) and a thickener (e.g., for affecting the viscosity of water-based and solvent-based formulations such as paints). Talc is also known to improve adhesive and mechanical properties of paints, and to permit paint formulations to contain significantly smaller amounts of organic solvents. Abrasives are natural or synthetic substances that are known for use in coatings as well as in many other applications. Known abrasive grains and powders (sometimes referred to as "grit") include natural abrasives such as garnet, and artificial (manufactured) abrasives such as aluminum oxide and boric carbide (sometimes referred to as "boron carbide"). It will be apparent to the ordinarily skilled artisan who reads this disclosure that pigments and abrasives other than those specifically mentioned herein can he used in practicing the present invention.

Of particular import to practice of the present invention is the use of nanolaminates such as those disclosed by the aforementioned Yializis et al. U.S. Pat. No. 5,912,069, incorporated herein by reference. Other United States patent documents instructive in the realm of nanolaminate structures or entities include the following, each of which is incorporated herein by reference: Schreiber et al. U.S. patent application Publication U.S. 2002/0071962 A1 published Jun. 13, 2002; Atita U.S. Pat. No. 5,472,795 issued Dec. 05, 1995. The present invention uniquely applies nanolaminate technology such as taught by Yializis et al. by incorporating metal-polymer nanolaminate particulate as a kind of "pigmentation" in a coating formulation, in order to impart electromagnetic and/or thermal reflectance, absorption and/or emission characteristics to the cured formulation.

According to typical inventive embodiments, the nanolaminate particulate will constitute ten percent or less (more typically, five percent or less), in percent weight, of the overall inventive composition. The nanolaminate particles can be selectively "screened" so as to all have the same size or so as to have two or more different sizes, wherein the particle size will generally not exceed about 250 microns. According to typical inventive practice, the major ingredients will fall within ranges in terms of weight percentage of the overall inventive composition, as follows: nanolaminate elements, in the range between greater than zero percent and about ten percent; epoxy resin (Resins in Components "A" and "B" combined), in the range between about fifteen percent and about thirty-five percent; pigment elements (other than nanolaminate elements), in the range between about five percent and about twenty percent; abrasive elements, in the range between greater than zero percent and about seventy percent; thickener/strengthener, in the range between greater than zero percent and about fifteen percent.

Yializis et al. disclose nanolaminate material having a metal component and a polymer component. Bulk metalpolymer nanolaminate material is made which includes at least a thousand alternating metal and polymer layers. Metal-polymer nanolaminate particulate (a "nanoflake product") is made from the bulk metal-polymer nanolaminate material by dividing it into more managable portions (such as by cutting the bulk material into strips) and then comminuting or pulverizing the strips into the metal-polymer nanolaminate particulate (e.g., powder). The resultant particle sizes range between as low as 1 micron or less and as high as about 250 microns. The particulate can be filtered (e.g., screened) to yield a desired particle size or size distribution. At least one metal, such as any metal element among the following, can be used as the metal component of the metal-polymer nanolaminate material: aluminum, boron, silicon, titanium, lithium, sodium, potassium, iron, magnesium and hafnium.

With reference to FIG. 2, aircraft carrier 10 has a fore end (bow) 11, an aft end (stern) 12, a leftband side (port) 13 and a righthand side (starboard) 14. Aircraft carrier 10 includes a flight deck 16 upon which are situated four jet blast deflectors 18 and four corresponding catapults 20. Deck 16 is essentially planar (flat) and is generally, albeit asymmetrically, characterized by a longitudinal axis, midline m, which is aligned with the forward direction of aircraft carrier 10 and which roughly bisects deck 16.

The deck 16 surface is covered, but not completely covered, by an inventive LSA nonskid coating composition 30. The inventive coating composition 30 is selectively applied so as to define a unique groove pattern. The present invention's groove pattern can be formed in the inventive coating 30 while curing (i.e., during the "pre-cure" stage in which inventive coating 30 has initially been applied to deck 16, but prior to the complete curing of inventive coating 30), using impressing or other types of known techniques for forming grooves such as those employed by the U.S. Navy to form conventional longitudinal grooves aboard aircraft carriers. When completely cured, inventive coating 30 has running therethrougb a linear longitudinal medial groove 32 and plural discrete "herringbone" grooves 34. The "herringbone" grooves 34 can be synonymously described as "W"-shaped grooves 34. Each herringbone groove 34 defines a "W" shape such as may appear when viewed from an upper vantage location of the bow 11 area. Each herringbone groove 34 extends athwartship on opposite sides of medial groove 32. Grooves 32 and 34 can be synonymously described as "grooves," "troughs," "furrows" or "channels." Medial groove 32 is approximately coincident with midline m.

Although FIG. 2 shows a total number of twenty-two herringbone grooves 34, any plural number of herringbone grooves 34 can be inventively practiced, depending upon the embodiment. Most inventive embodiments will provide for ten or more herringbone grooves 34, some over a hundred herringbone grooves 34. Each herringbone groove 34 includes four linear groove segments 36 which are slanted relative to medial groove 32. In each herringbone groove 34, groove segments 36 alternate in orientation so as to be, with some approximation, alternately oblique and parallel with respect to each other. Each herringbone groove 34 "fluid-connectively" intersects medial groove 32 at a medial intersection point 40, reaches or nearly reaches the extreme port 13 at a port meeting point 42P, and reaches or nearly reaches the extreme starboard 14 at a port meeting point 42S.

Each herringbone groove 34 intersects medial groove 32 at medial intersection point 40 in a fluid-connective manner, i.e., so as to define groove continuity permitting continuous fluid flow between medial groove 32 and both inner groove segments 36B of herringbone groove 34. Medial groove 32 acts as a central or medial drainage channel, while herringbone grooves 34 act as lateral drainage channels. Drainage of liquid situated on deck 16 will occur in two ways, viz., (i) by liquid flowing athwartship laterally in both the port 13 and starboard 14 directions via herringbone grooves 34, and (ii) by liquid flowing longitudinally aftward via medial groove 32. FIG. 2 illustrates but one example of the diverse drainage groove configurations which can be inventively practiced with beneficial effect in terms of improving nonskid decking properties pertaining to drainage and traction.

Each herringbone groove 34 includes: (i) an outer (more lateral) port groove segment 36PA (which extends between port vertex 44P and port meeting point 42P); (ii) an inner (less lateral) port groove segment 36PB (which extends between port vertex 44P and medial intersection point 40; (iii) an outer (more lateral) starboard groove segment 36SA (which extends between starboard vertex 44S and starboard meeting point 42S); (iv) an inner (less lateral) starboard groove segment 36SB (which extends between starboard vertex 44S and medial intersection point 40).

It can be considered that each herringbone groove 34 includes two "V"-shaped groove sections 38, viz., a port V-shaped groove section 38P and a starboard V-shaped groove section 38S. Port V-shaped groove section 38P is formed by port groove segments 36PA and 36PB, which meet at vertex 44P. Starboard V-shaped groove section 38S is formed by starboard groove segments 36SA and 36SB, which meet at vertex 44S. In port V-shaped groove section 38P, groove segment 36PA is closer to port 13, whereas groove segment 36PB is closer to midline m. In starboard V-shaped groove section 38S, groove segment 36SA is closer to starboard 14, whereas groove segment 36SB is doser to midline m.

As shown in FIG. 2, every groove segment 36 is disposed at an obtuse angle $\theta$ with respect to the forward direction of travel, which is essentially in parallel with midline m as well as with medial groove 32. According to many inventive embodiments, each groove segment 36 is oriented at roughly a one hundred thirtyfive degree (135°) off-angle $\theta$ with respect to the forward motion. It is preferred inventive practice that each groove segment 36 be at an off-angle, with respect to the forwardly moving direction, which is in the range between about one hundred twenty degrees (120°) and one hundred fifty degrees (150°). Accordingly, each V-shaped groove section 38 describes, between its two groove segments 36, a geometric angle $\phi$ that is in the range between about 60° and about 120°. Every V-shaped groove section 38 "points," via vertex 44, in the direction of forward travel. The inventive herringbone patterning system thus describes, on each side of medial groove 32, a continuous or substantially continuous longitudinal series of V-shaped groove sections 38 which each point in the. direction of forward travel. This inventive patterning should prove especially advantageous in landing areas.

As FIG. 2 illustrates, each linear groove segment 36 is disposed at an obtuse off-angle $\theta$, in the range between approximately 120° and approximately 150°, with respect to the forward direction described by linear medial groove 32. Geometric lines $l_P$ and $l_P$, which are parallel to midline m and to each other, are included in FIG. 2 to demonstrate angular relationships. Port groove segment $36_{PA}$ is inclined at an angle $\theta_{PA}$ with respect to the linear medial groove 32. Port groove segment $36_{PB}$ is inclined at an angle $\theta_{PB}$ with respect to the linear medial groove 32. Starboard groove segment $36_{SA}$ is inclined at an angle $\theta_{SA}$ with respect to the linear medial groove 32. Starboard groove segment $36_{SB}$ is inclined at an angle $\theta_{SB}$ with respect to the linear medial groove 32.

It is not necessary that the angles θ be equal or nearly so. As the present invention will frequently be practiced, the angles θ will differ from each other to an appreciable degree while still maintaining in principle the present invention's groove pattern; nevertheless, it may be preferable according to some inventive embodiments to "standardize" the angularities so as to render every angle θ approximately 120° or some other measurement. Nor need the lengths of the groove segments 36 be equal or nearly so. The groove segment 36 lengths can differ significantly from one another, while remaining true to the inventive concept. According to inventive practice in general, the dimensions of grooves 32 and 34 (e.g., in terms of length, width and depth) will vary depending on the embodiment. Inventive practice will usually not provide for grooving that is more than an inch deep or more than an inch wide, and these dimensions will typically be smaller. In the light of the instant disclosure, the ordinarily skilled artisan will be capable of practicing the present invention in any of multifarious inventive groove pattern configurations.

The present invention's groove pattern of the flight deck coating beneficially represents a more optimal alternative design as compared to the groove pattern of the flight deck coating currently in use aboard U.S. Navy aircraft carriers. Firstly, the creation of a bow-wave of fluid is limited in practice of the inventive herringbone pattern, since liquids will generally be squeezed sideways and aft from the friction surface of a forward moving aircraft's tire. In contrast, in practice of conventional patterns, the liquids will generally be squeezed forward with the frictional surface of the forward moving aircraft's tire. Conventional practice of longitudinal linear grooves provides for drainage fore-and-aft. As distinguished therefrom, inventive practice of herringbone grooves provides for drainage which is primarily laterally athwartship (via the plural herringbone grooves 34) and which is secondarily longitudinally aftward (via the single longitudinal linear medial groove 32). In this regard, it is important to inventive practice that the inventive grooves 32 and 34 be at least substantially continuous in length. Thus, inventive practice will at least largely eliminate the presence of spilled and other fluids from the frictional area of the flight deck. Furthermore, a lesser likelihood of moving when an aircraft is at rest and untethered is associated with the present invention's herringbone pattern. According to inventive practice, the frictional angle of each individual tire will often oppose that of the opposite tire, thus creating additional safety traction to the aircraft regardless of the random wind or wave moments on the aircraft.

Figure 3:
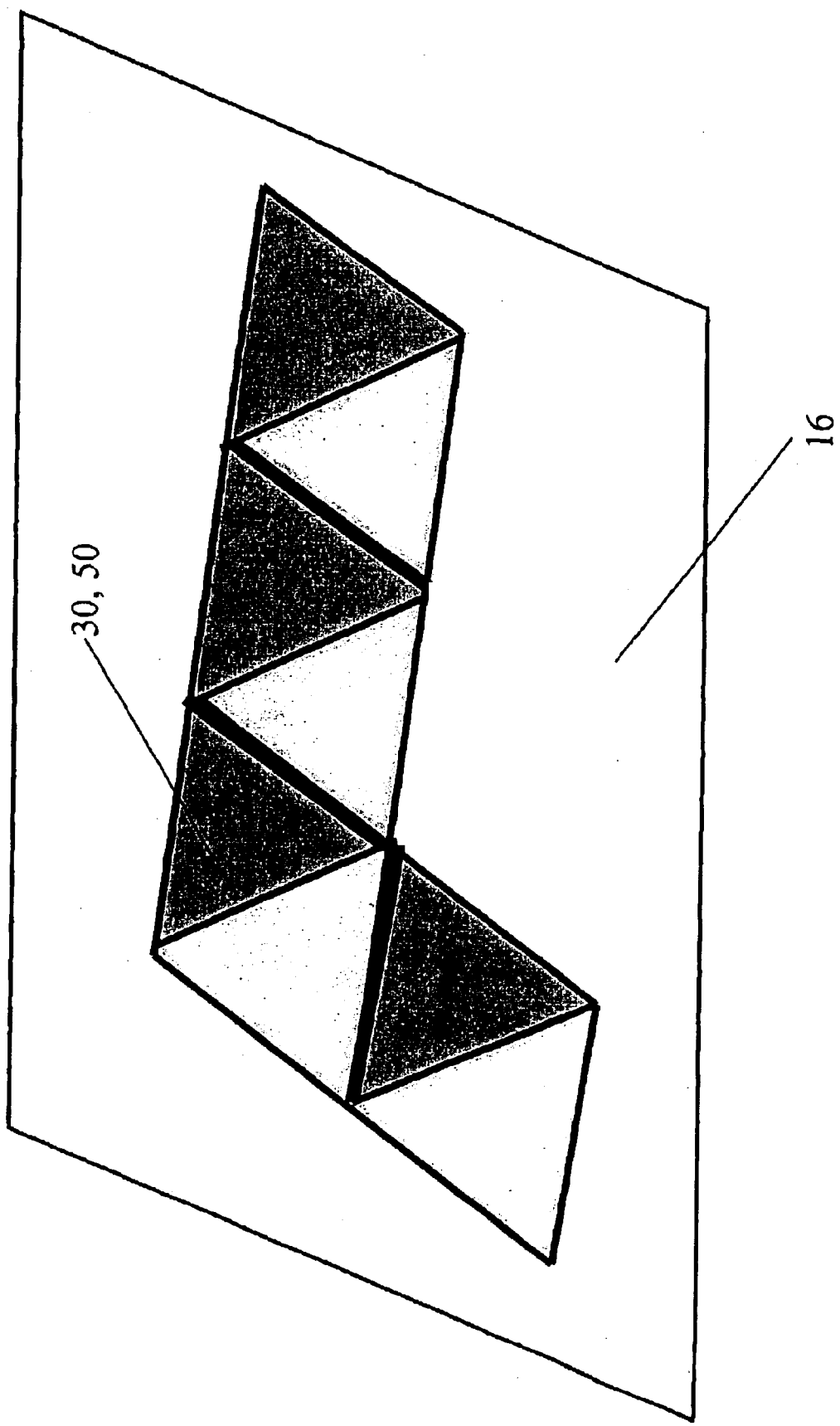
FIG. 3 is a partial and enlarged diagrammatic perspective view of an inventive embodiment such as that which is shown in FIG. 2, particularly illustrating the pyramidal textural pattern characteristic of many inventive embodiments.

Reference now being made to FIG. 3, an additional feature of many inventive embodiments is a pyramidal nonskid surface texture of the inventive coating 30. As shown in FIG. 3, fully cured inventive coating 30 is characterized by a two-dimensional pyramidal array, i.e., a repeating pattern of congruent pyramids 50. The present invention's "engineered" pyramidal textural pattern affords improved thermal signature dispersion while imparting nonskid attributes. As compared with conventional nonskid surfaces which lack a deliberate dimensional quality (e.g., are uniformly flat or smooth along the length of the ship), the present invention's pyramid-textured nonskid coating 36 surface represents a pyramidal diffusional structural system which serves to contribute significantly to the reduction of the infrared signature of inventive coating 30, especially at near grazing angles. This is because, by virtue of the individual pyramidal nonskid structures 50, the apparent surface area at any given angle of electromagnetic incidence will be reduced in comparison with the angle of electromagnetic incidence which would occur if the incident location were part of a uniformly flat/smooth surface as typified by conventional nonskid coatings.

Incorporated by reference are the following United States patents disclosing "engineered" abrasive surfaces or related methods: Nevoret et al. U.S. Pat. No. 6,451,076 B1 issued Sep. 17, 2002; Swei et al. U.S. Pat. No. 6,395,044 B1 issued May 28, 2002; Wei et al. 6,293,980 B2 issued Sep. 25, 2001; Caracostas et al. U.S. Pat. No. 6,096,107 issued Aug. 1, 2000; Wei et al. U.S. Pat. No. 5,863,306 issued Jan. 26, 1999; Wei et al. U.S. Pat. No. 5,833,724 issued Nov. 10, 1998. For purposes of preferentially configuring the inventive coating 30 which covers a deck 16, there are various techniques can be adopted by the inventive practitioner for forming the pyramids 50 into the coating 30 as well as for forming the grooves 32 and 34 into the coating 30. Many embodiments of inventive composition 30 will be "trowelable," that is, suitable for application using a trowel or trowel-like apparatus. While composition 30 is curing, it can be inventively "troweled" so as to configure it to desired specifications in terms of both (i) grooves 32 and 34 and (ii) pyramidal structures 50.

To elaborate, a possible approach to effecting pyramidal structures 50 in inventive coating 30 would involve the use of molding apparatus. The inventive coating 30 is cured while in contact with a mold surface characterized by the inverse of the desired pyramid-patterned surface. Thus, a pyramidal pattern according to the present invention can be impressed on a nonskid composition that has been deposited on the deck 16 surface; that is, the pyramidal pattern can be "stamped" into a pre-cured nonskid material prior to complete cure of the nonskid material. According to another possible approach along the lines of that disclosed by the above-noted Wei et al. U.S. Pat. No. 5,863,306, a layer of the inventive coating 30 is deposited on the deck 16 surface and is then treated to render it plastic but nonflowing. The pyramidal pattern is embossed on the surface of the inventive coating 30 layer, and inventive coating 30 is then cured.

It is to be understood that an inventive LSA nonskid coating 30 need not constitute a single layer situated upon a substrate. The inventive coating 30 can be applied plural times so as to correspondingly constitute plural layers. Furthermore, the inventive coating 30 layer(s) need not be only coating layer(s) which is (are) applied to a substrate such as a deck 16. One or more noninventive coating layers may be applied beneath or between the inventive coating 30 layer or layers in any of various arrangements so that the overall coating structure describes plural layers, preferably wherein at least one inventive coating 30 layer is on top. For instance, it is common practice to apply (e.g., by spray or roller) a metal primer to a metal surface such as a deck 16, prior to applying a nonskid coating thereto. Generally, a nonskid coating should be applied to the primed metal surface no later than about thirty-six hours of the primer application.

Other embodiments of the present invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A coating composition which, in an uncured condition, comprises by percentage weight:

nanolaminate pigment elements in the range between greater than zero percent and approximately ten percent;

epoxy resin in the range between approximately fifteen percent and approximately thirty-five percent;

non-nanolaminate pigment elements in the range between approximately five percent and approximately twenty percent; and abrasive elements in the range between greater than zero percent and approximately seventy percent.

2. A structure for situation upon a substrate, said structure comprising a coating composition in a cured condition, said structure having formed therein an approximately linear medial groove and plural herringbone grooves, each said herringbone groove traversing said medial groove so as to be divided thereby into two V-shaped groove sections, each said V-shaped groove section being formed by two approximately linear groove segments, each said groove segment being obliquely oriented with respect to said medial groove.

3. The structure according to claim 2, wherein each said V-shaped groove section describes, between its said groove segments, a geometric angle in the range between approximately 60° and approximately 120°.

4. The structure according to claim 2, wherein each said groove segment describes, relative to said medial groove, an obtuse geometric angle in the range between approximately 120° and approximately 150°.

5. The structure according to claim 2, wherein at least a portion of said structure is approximately characterized by a pyramidal texture.

6. The structure according to claim 2, wherein:

said substrate is a marine deck;

said marine deck is approximately characterized by a forward deck end, an aft deck end and a deck length therebetween;

said medial groove runs along at least part of said deck length; and each said V-shaped groove section points approximately toward said forward deck end.

7. The structure according to claim 6, wherein said medial groove extends at least substantially the entire said length.

8. The structure according to claim 6, wherein:

said marine deck is approximately characterized by a port deck side and a starboard deck side;

each said herringbone groove extends at least substantially the entire distance between said port deck side and said starboard deck side.

9. The structure according to claim 8, wherein said medial groove extends at least substantially the entire said length.

10. The structure according to claim 9, wherein said medial groove is approximately equidistant between said port deck side and said starboard deck side.

11. The structure according to claim 9, wherein each said V-shaped groove section describes, between its said groove segments, a geometric angle in the range between approximately 60° and approximately 120°.

12. The structure according to claim 9, wherein each said groove segment describes, relative to said medial groove, an obtuse geometric angle in the range between approximately 120° and approximately 150°.

13. The structure according to claim 9, wherein at least a portion of said structure is approximately characterized by a pyramidal texture.

14. The structure according to claim 9, wherein said coating composition has previously been disposed on said marine deck in an uncured condition, said medial groove and said herringbone grooves having been formed in said coating composition while in an uncured condition.

15. The structure according to claim 14, wherein said coating composition in a cured condition has nonskid and low solar absorbing properties.

16. The structure according to claim 15, wherein said coating composition in an uncured condition includes, by percentage weight of said coating composition in an uncured condition:

nanolaminate pigment elements in the range between greater than zero percent and approximately ten percent;

epoxy resin in the range between approximately fifteen percent and approximately thirty-five percent;

non-nanolaminate pigment elements in the range between approximately five percent and approximately twenty percent; and abrasive elements in the range between greater than zero percent and approximately seventy percent.

17. A method for applying a coating composition to a substrate, said method comprising:

disposing said coating composition while in an uncured condition upon said substrate; and forming in said coating composition while in an uncured condition an approximately linear medial groove and plural herringbone grooves, each said herringbone groove traversing said medial groove so as to be divided thereby into two V-shaped groove sections, each said V-shaped groove section being formed by two approximately linear groove segments, each said groove segment being obliquely oriented with respect to said medial groove.

18. The method for applying a coating composition as recited in claim 17, wherein each said groove segment describes, relative to said medial groove, an obtuse geometric angle in the range between approximately 120° and approximately 150°.

19. The method for applying a coating composition as recited in claim 18, wherein:

said substrate is a marine deck;

said marine deck is approximately characterized by a forward deck end, an aft deck end, a port deck side, a starboard deck side and a deck length between said forward deck end and said aft deck end;

said medial groove extends at least substantially the entire said length;

each said V-shaped groove section points approximately toward said forward deck end; and each said herringbone groove extends at least substantially the entire distance between said port deck side and said starboard deck side.

20. The method for applying a coating composition as recited in claim 18, said method further comprising forming in at least a portion of said coating composition while in an uncured condition a pyramidal textural pattern.

* * * * *